Patented Mar. 11, 1947

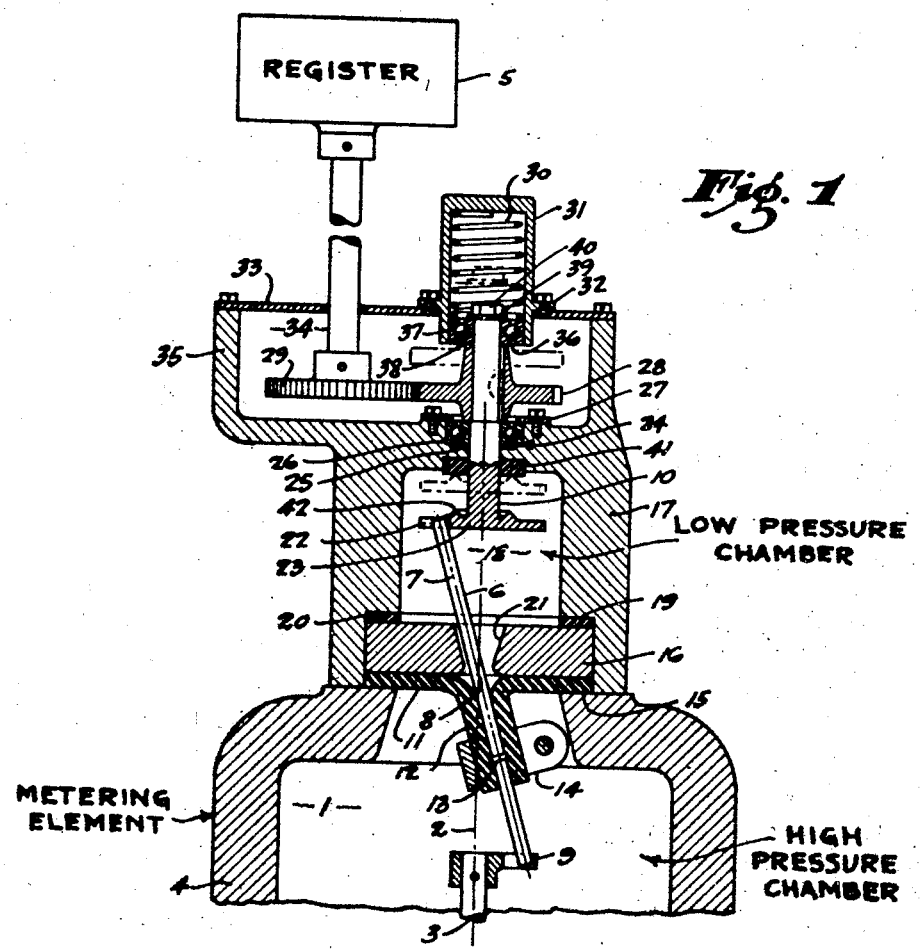

2,417,108

UNITED STATES PATENT OFFICE 2,417,108

METER SEAL AND STOP MECHANISM

Francis W. Guibert, Beverly Hills, and Frederic B. Fuller, Whittier, Calif.; said Fuller assignor to said Guibert Application June 21, 1944, Serial No. 541,354

5 Claims. (Cl. 192—116.5)

This invention relates to a sealed transmission, preventing escape of fluid under pressure from a closed container, while permitting mechanical transmission of motion through the seal.

One application of such a seal is found in fluid metering devices in which the metering element is placed in the path of flow of the fluid, motion of the element being transmitted to a register, or indicator, external of the metering element.

High pressure liquids or fluids requiring such metering are, for example, butane and propane, which are capable of forming a highly explosive mixture with air in the event such gases escape through the seal. When it is considered that pressures as high as 300 pounds per square inch are used in containers for such fluids, it becomes apparent that a thoroughly reliable sealing means must be provided which will be capable of withstanding wear for extended periods.

Ordinary packing glands have been proposed for such service, but wear unduly and are, therefore, impractical; and leaks are apt to develop that becomes progressively worse and, ultimately, an intolerable rate of escape of the fluid is encountered.

It is one of the objects of this invention to provide a safe sealing device of this character that remains safely sealed for long intervals.

It is another object of this invention to make it possible to safeguard against escape of fluid from the housing even if the main seal should fail.

This result is accomplished by the provision of an intermediate low pressure chamber between the housing elements and the indicator or register which forms the load for the transmission device. When the main seal fails, this chamber is subjected to high pressure; and this pressure, in turn, is used to seal off the low pressure chamber from the atmosphere.

It is another object of this invention to provide a motion transmission mechanism from the interior to the exterior of a housing device, which mechanism provides an indication in the event of a failure of the seal.

This effect is readily secured by the aid of the pressure that exists in the intermediate chamber upon such failure. This abnormal pressure may be used to disconnect the register from the meter.

This invention possesses many other advantages, and has other objects which may be made more clearly apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a view, mainly in longitudinal section, of a transmission system incorporating the invention, some of the parts being shortened to reduce the size of the figure; and Figs. 2 and 3 are fragmentary, enlarged sectional views of modified forms of the invention.

The transmission mechanism is shown as a metering element 1. This metering element includes a rotary member having an output axis 2 of rotation. Since such metering elements may take any of a variety of forms, it is necessary merely to state that the metering element is capable of exerting a torque on a shaft 3 about the axis 2, the angular motion of the metering elements and of shaft 3 being proportional to the volume of the fluid passing through the meter.

The metering elements may be enclosed in a body or casing 4. The motion of the metering element is finally registered upon a register or indicator 5 external of the casing 4.

The invention relates more particularly to the mechanism interposed between the register 5 and the metering element 1. In the present instance, a rod 6 forms one of the parts of the transmission from the metering element to the register 5. This rod may be aptly termed a "nutating" rod. It is arranged in such a way that its axis 7 describes a double cone of revolution, the apex 8 of the double cone falling on the axis 2 of the metering element 1.

Accordingly, if the lower end of the rod 6 is coupled to a crank 9, or the like, rotated by the metering element, the upper end of the rod can be used to impart rotation to a shaft 10. This shaft 10, in turn, as hereinafter explained, is mechanically coupled to drive the register 5. Axial movement of shaft 10 may occur (as will be described hereinafter), in response to certain conditions of operation.

It is essential to provide a seal for the body around the rod 6. For this purpose, use is made of a rubber-like diaphragm 11 which may be made, for example, of "Hycar," a well known synthetic rubber-like material. This material is desirably chemically inert and, therefore, can withstand normal conditions of operation for extended periods.

In order to seal directly around rod 6, the diaphragm 11 is provided with a central sleeve 12 which closely contacts the rod 6. Rod 6 may be provided with an enlargement or bead 13, located within the sleeve 12 and firmly gripped by the sleeve. Furthermore, a clamp 14 is also provided for tightly compressing the sleeve about the rod 6 in the region where the bead 13 is located. The sleeve 12 may, of course, be otherwise attached to the rod 6, as by molding or pressing.

The motion of the rod 6, describing the double cone of revolution, serves to flex the central portion of the diaphragm 11 about a circle at the base of the sleeve. The sleeve 12 is thus angularly moved about the metering element axis 2.

In order to seal the edge of diaphragm 11 against the external surface 15 of the housing 4, use is made of a reinforcing collar 16 disposed above the diaphragm 11. In this way, even under the extremely high pressures that may be encountered, there is no danger that the diaphragm 11 will be extruded out of the casing 4. And, since the sleeve 12 is directed inwardly in casing 4, the high pressures therein are impressed upon the external sleeve surfaces to tighten the seal around rod 6.

The collar 16 is shown as disposed in the bottom portion of a hollow member or housing 17 that forms an intermediate low pressure chamber 18. This hollow member 17 may be provided with a shoulder 19 against which a sealing washer or gasket 20 may be disposed. The collar 16 is shown as confined between the gasket 20 and the diaphragm 11. Appropriate fastening means may be utilized to hold the hollow member 17 firmly upon the body 4. Furthermore, the collar 16 may be provided with a conical central aperture 21 to provide a clearance for the rod 6 as it describes its motion.

The upper end of rod 6 is shown as accommodated in a slot 22 of a collar 23 attached to the lower end of shaft 10. Accordingly, for each complete revolution of crank 9, one revolution is imparted to the shaft 10.

Shaft 10 is shown as extending through the upper wall of the member 17. To permit ready rotation of shaft 10, a ball bearing structure 24 is disposed in a recess in the upper wall of housing 17. This structure 24, which is a combination radial and thrust bearing, has an inner race 25 through which the shaft 10 has a sliding fit. Outer race 26 is restrained against axial movement by a washer 27 having its inner edge extending inwardly over the race 25. Externally of the housing 17 a spur gear 28 is keyed to the shaft 10 and is normally in mesh with the spur gear 29 that drives the register 5. The hub of gear wheel 28 may rest directly upon the inner race 25; thus, the weight of the shaft and its associated parts can maintain the shaft 10 in the full line position shown.

By means of gears 28 and 29, the register 5 is operated in accordance with the cyclic movement of rod 6.

While shaft 10 may be urged downwardly to be in operative relation with the rod 6 merely by its own weight, a supplemental resilient force may be used. Thus, a compression spring 30 is provided. It is housed in a barrel 31 fastened, as by aid of flange 32, to a flat cover plate 33. This cover plate extends over the gear compartment 34 formed by walls 35 extending above housing 17. The spring 30 acts upon a ball bearing structure 36 arranged around the upper end of shaft 10. The outer race 37, against which spring 30 rests, is slidable in barrel 31. The inner race 38 is fastened to the shaft 10 and against the upper surface of the hub for wheel 28, as by a washer 39 and a cap screw 40. The spring 30 thus constantly exerts a pressure in an axial direction on shaft 10; and, furthermore, a supplemental bearing is provided for shaft 10.

In the event the seal around rod 6 should fail, the intervening low pressure chamber 18 would receive the fluid under pressure from casing 4. This abnormally high pressure in chamber 18 can then act upon the collar 23 as a piston, to urge the shaft 10 upwardly. At the same time, a sealing washer 41, interposed between the collar 23 and the upper wall of the member 17, is placed into sealing contact with respect to the collar 23, and thus the fluid is kept from escaping to the atmosphere. To effect a good seal, the upper surface of collar 23 carries a sharp edged flange 42 that is urged into the lower surface of washer 41.

The upper position of the shaft 10 is indicated in the dot-and-dash lines in Fig. 1. The axial movement of the shaft 10 operates to move the spur gear 28 out of mesh with spur gear 29, and register 5 stops because the collar 23 moves out of engagement with rod 6. This disengagement between rod 6 and the register operating mechanism is important, since thereby the meter shaft 3 can continue to rotate without danger of breaking any of the transmission elements. Furthermore, since register 5 stops, there is an indication that the diaphragm 11 has failed.

The rod 6 is purposely made of such length that it is insufficient to maintain connection between crank 9 and collar 23 when the collar moves upwardly to the sealing position.

In Fig. 2 a slightly different form of support for the "nutating" rod is indicated. In this form the rod 43, corresponding to rod 6 in Fig. 1, is shown as having a collar 44 provided with a spherical surface. This surface is centered at point 8. This spherical surface is shown as urged against a corresponding spherical surface 45, formed in the lower portion of the reinforcing collar 46 disposed above diaphragm 11.

In the form illustrated in Fig. 3, the "nutating" rod 47 is shown as having a collar 48 similar to collar 44 in Fig. 2. Rolling elements, such as ball bearing elements 49, are interposed between the collar 48 and the spherical surface 50 of the reinforcing collar 51. A ring 52 is shown in this instance to retain the ball bearings 49 against dropping out from between the collar 48 and the spherical surface 50. The aperture 53 in collar 51 is small enough to prevent egress of the balls 49 therethrough.

When the forms shown in Figs. 2 and 3 are used, the "nutating" rod is definitely restricted against any motion except to describe the conical paths about the apex 8.

The inventors claim:

1. In a transmission mechanism: a fluid-tight housing subjected to pressure; a movable element within the housing; a load; a mechanical connection between the element and the load; means forming an intermediate low pressure chamber between the element and the load; and means operating in response to a rise in pressure in said chamber for sealing said chamber, said last named means including an element that extends out of said chamber, the position of which changes on abnormal pressure in said chamber.

2. In a transmission mechanism: a fluid-tight housing; a load; means forming a low pressure chamber between the housing and the load; and a mechanical transmission extending from inside the housing and through the chamber, including an axially movable shaft extending from the chamber and normally coupled to the load; and means responsive to the existence of abnormal pressure in the chamber for urging the shaft axially outwardly, whereby the drive to the load is interrupted.

3. In a transmission mechanism: a fluid-tight housing; a load; means forming a low pressure chamber between the housing and the load; and a mechanical transmission extending from inside the housing and through the chamber, including an axially movable shaft extending from the chamber and normally coupled to the load; a gear wheel carried by the shaft for driving the load; and means responsive to the existence of abnormal pressure in the chamber for urging the shaft axially outwardly of the chamber for moving said wheel out of driving relation to the load.

4. In a transmission mechanism: a driver; a housing therefor; a rod connected to the driver and extending out of the housing, the axis of said rod, when driven by the driver, describing a double cone of revolution about an apex without any angular motion about its own axis; a resilient diaphragm for sealing said housing and having an integral sleeve through which the rod passes near said apex; a load; means forming a low pressure chamber between the load and the driver; a shaft extending into the chamber and adapted to drive the load; a collar on the shaft engaged by the outer end of the rod for rotating the shaft; and a seal disposed around the shaft and urged into sealing relation to the shaft upon the occurrence of abnormal pressure in the chamber.

5. In a transmission mechanism, a rod; means for driving the rod so that the axis of the rod describes a double cone of revolution; means for supporting the rod; a driving element co-operating with one end of the rod; and a driven element co-operating with the other end of the rod; the coupling between the rod and the elements being disengageable by mere relative movement between the rod and the elements in a direction corresponding to the axis of the double cone; said rod being of such length that material relative disengaging movement between the driving and driven elements causes one or both of said elements to become disengaged from the rod.

FRANCIS W. GUIBERT.
FREDERIC B. FULLER.

REFERENCES CITED

The following references are of record in the file of this patent:

UNITED STATES PATENTS

| Number | Name | Date |
|---|---|---|
| 2,065,834 | Swennes | Dec. 29, 1936 |
| 459,332 | Nash | Sept. 8, 1891 |
| 2,046,477 | Ohmart | July 7, 1936 |
| 2,194,262 | Allen et al. | Mar. 19, 1940 |
| 433,088 | Nash | July 29, 1890 |
| 2,186,786 | Jensen | Jan. 9, 1940 |
| 2,065,589 | Hufferd | Dec. 29, 1936 |

FOREIGN PATENTS

| Number | Country | Date |
|---|---|---|
| 98,143 | Swiss | Mar. 1, 1923 |
| 347,676 | British | Apr. 24, 1931 |